United States Patent [19]

Tervola

[11] Patent Number: 5,021,037
[45] Date of Patent: Jun. 4, 1991

[54] STEPLESS TRANSMISSION WITH STEERING

[76] Inventor: Pentti J. Tervola, 3663 Lakewood Rd., Lake Worth, Fla. 33461

[21] Appl. No.: 484,684

[22] Filed: Feb. 23, 1990

Related U.S. Application Data

[63] Continuation-in-part of Ser. No. 303,079, Jan. 30, 1989, Pat. No. 4,913,003, which is a continuation-in-part of Ser. No. 909,009, Sep. 18, 1986, abandoned.

[51] Int. Cl.$^5$ ............................................. F16H 37/00
[52] U.S. Cl. ......................................... 475/25; 180/62
[58] Field of Search .................... 475/18, 19, 21, 23, 475/24, 25, 26; 180/6.2, 6.48, 6.5

[56] References Cited

U.S. PATENT DOCUMENTS

| | | | |
|---|---|---|---|
| 2,580,946 | 1/1952 | Orshonsky, Jr. et al. | 475/24 |
| 3,343,621 | 9/1967 | Van Doorne | 180/6.2 X |
| 3,376,760 | 4/1968 | Gordanier | 475/25 |
| 4,085,697 | 4/1978 | Gaasenbeek | 180/6.2 X |
| 4,154,314 | 5/1979 | Tsuji et al. | 180/6.2 |
| 4,273,206 | 6/1981 | van der Lely | 475/25 X |
| 4,497,218 | 2/1985 | Zaunberger | 180/6.2 X |
| 4,685,353 | 8/1987 | Cadee et al. | 475/25 |
| 4,719,396 | 1/1988 | Shimizu | 180/6.5 X |
| 4,848,186 | 7/1989 | Dorgan et al. | 475/24 |
| 4,917,200 | 4/1990 | Lucius | 180/6.2 |

*Primary Examiner*—Dwight Diehl
*Attorney, Agent, or Firm*—alvin S. Blum

[57] ABSTRACT

A stepless transmission and steering system is provided for a vehicle having at least two propelling elements such as wheels, tracks, propellers and the like driven by two output shafts. A housing contains a pair of planetary transmission gear sets, both driven by a common input shaft. Each gear set powers one of the output shafts. A separate variator is connected to each gear set. Each variator controls the speed and direction of rotation of its associated output shaft in a continuous, stepless fashion with a single control member. A neutral-seeking servo mechanism is provided. By turning both output shafts at the same speed and direction, the vehicle runs in a straight line. When one shaft is turned faster, the vehicle runs in a curved line. When each shaft is turned in opposite directions, the vehicle turns within its own length. The variators may include variable diameter pulleys coupled with endless belts.

29 Claims, 5 Drawing Sheets

STEPLESS TRANSMISSION WITH STEERING

This application is a continuation in part of copending application Ser. No. 303,079 filed 1/30/89 which issued on 4/3/90 as U.S. Pat. No. 4,913,003 which is a continuation in part of Ser. No. 06/909,009 filed 9/18/86, now abandoned.

TECHNICAL FIELD

This invention relates generally to power transmissions and steering mechanisms, and more particularly to a continuously variable, reversible, power transmission that also provides steering by differentially varying the rotation rate and direction of two output shafts.

BACKGROUND ART

Continuously variable transmissions operate by transferring rotational power from an input shaft to an output shaft. The rate of rotation of the output shaft, and even its direction, may be varied relative to the rate and direction of rotation of the input shaft by means of a mechanism that is presently referred to as a variator. The variator may be operated by a single control that may be moved from maximum speed in a first direction to zero output or neutral and then progressively faster speeds in a reverse direction until maximum speed position of the control causes the variator to affect maximum speed of rotation of the output shaft in the second direction.

In the usual application to a vehicle, the output shaft is operatively connected to a pair of driving elements such as wheels through a differential. Steering is generally provided by rotating a pair of non-driven wheels. In track driven vehicles it is common practice to differentially vary the rotation rates of the shafts driving each track. With propeller drives it is common practice to drive twin propellers with separate motors, using rudders for further steering control.

Continuously variable, or stepless, transmissions have been described by Andrus, U.S. Pat. No. 2,745,297; Gillade, U.S. Pat. No. 4,406,178, General, U.S. Pat. No. 3,203,277; Mills, U.S. Pat. No. 4,823,627; and Uchikawa, Japan 57-51050. Tervola in the parent, copending application Ser. No. 303,079, of which this is a continuation in part, discloses a stepless planetary gear type transmission with a variable diameter pulley/belt variator that includes a servo-mechanism for maintaining a neutral or zero output under control of a single control lever for forward, neutral and reverse. Tervola, in U.S. Pat. No. 4,718,508 teaches a steering mechanism in which a single input drives two output shafts through a pair of planetary gear systems. Each planetary gear system includes a ring gear, a sun gear and a planetary gear carrier with planetary gears that mesh with both the ring gear on the outer side and the sun gear on the inside of the circle. A power-driven shaft between the planetary gear sets has driving engagement with both of the sun gears or the planetary gear carriers and the respective output shafts are driven by the other one of the sun gears or planetary gear carriers. A steering shaft is operatively engaged with both ring gears in such manner as to hold them against rotation for straight-line propulsion with both output shafts running at the same speed. For turning, the steering shaft is rotated by a bidirectional steering motor and a steering wheel to rotate the two ring gears in opposite directions so that the two output shafts will be rotating at different speeds and may also be rotating in different directions. See also "Popular Science" July, 1985 pages 60-62 entitled "Tanks and Dozers turn on a dime with new all-gear steering". This teaches a power differential and a steering differential geared together.

It is costly to manufacture and maintain separate structures for speed control, differentials and steering according to prior art teaching that they be separate structures.

DISCLOSURE OF THE INVENTION

It is accordingly an object of the invention to provide a stepless transmission with two outputs for steering that will change from forward to neutral to reverse with continuous control of output speed and direction of each output without interruption or the necessity of disconnecting the output temporarily from power.

It is another object of the invention to provide a mechanism for automatically regulating neutral or zero output under certain control conditions.

It is yet another object of the invention to provide a stepless transmission with two power outputs for steering, incorporating a pair of planetary gear systems for individual output control of speed and direction of each wheel.

It is yet another object to provide a combined steering and stepless transmission that does not require a separate bidirectional steering motor.

The combined steering and stepless transmission apparatus of the invention includes two planetary gear sets. Each gear set has an output shaft for driving a driven element. The driven element may be a wheel, a track or a propeller. At least one input shaft supplies input power to both planetary gear sets. Each planetary gear set is provided with a separate variator. The variator acts on the planetary gear set to vary the rotation rate of the output shaft continuously from fast forward to slow to neutral and then reverse under the control of a control element. By simultaneous operation of the two control elements, the vehicle may be driven in a straight line at any forward or reverse speed within the range provided in a straight line by setting both control elements at the same speed and direction. By setting each control element at a different speed, the vehicle may be driven in a curvilinear path. By setting one control forward and one control in reverse, the vehicle may be turned in a circle of its own length. The system provides means for precisely regulating the relative rates of rotation of two rotating elements driven by the same power source.

These and other features, objects and advantages of the invention will become more apparent when the following detailed description is read in conjunction with the accompanying drawings.

MODES OF CARRYING OUT THE INVENTION

Figure 1:
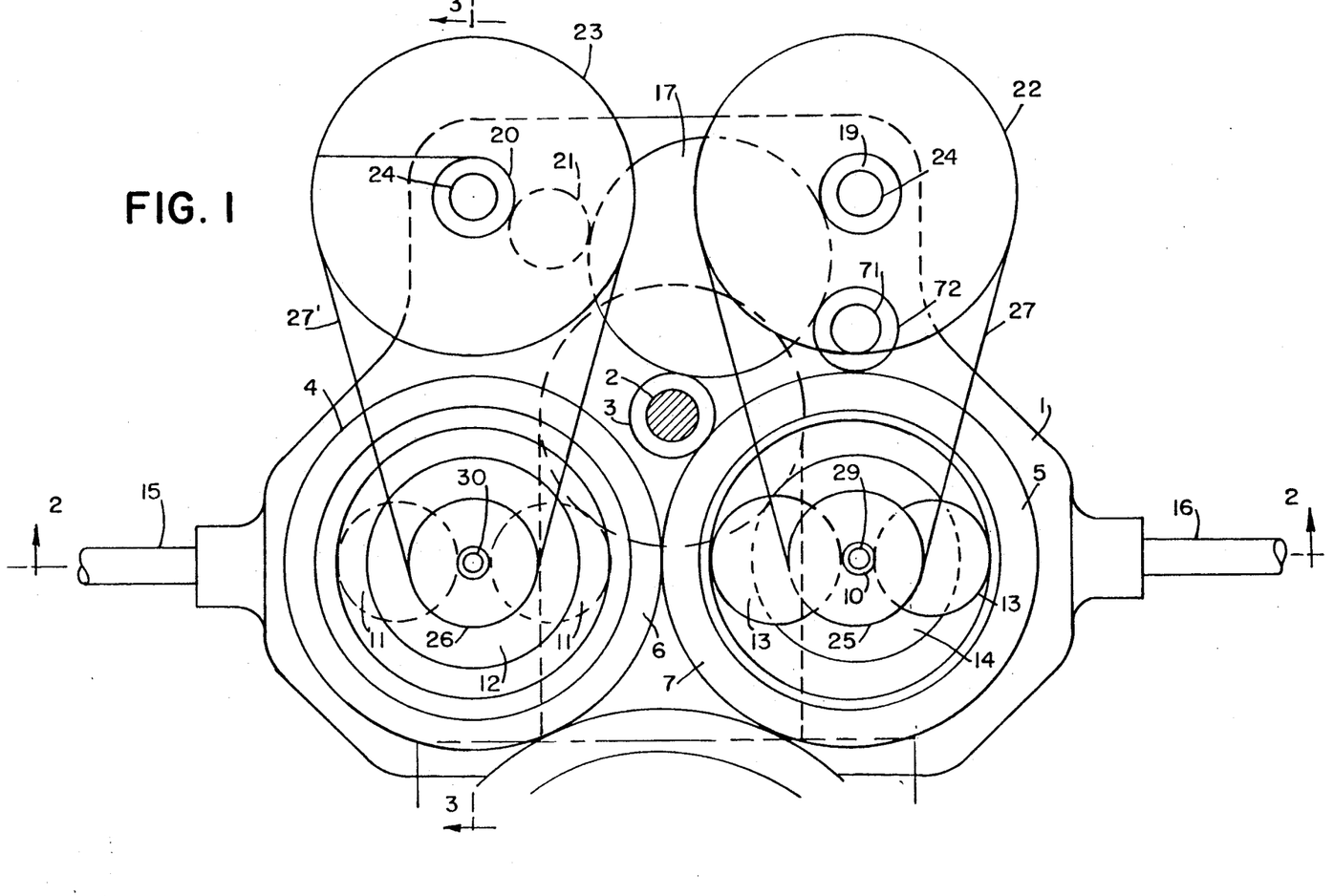
FIG. 1 is a diagrammatic top view, partially broken away of the combined transmission and steering invention.
Figure 2:
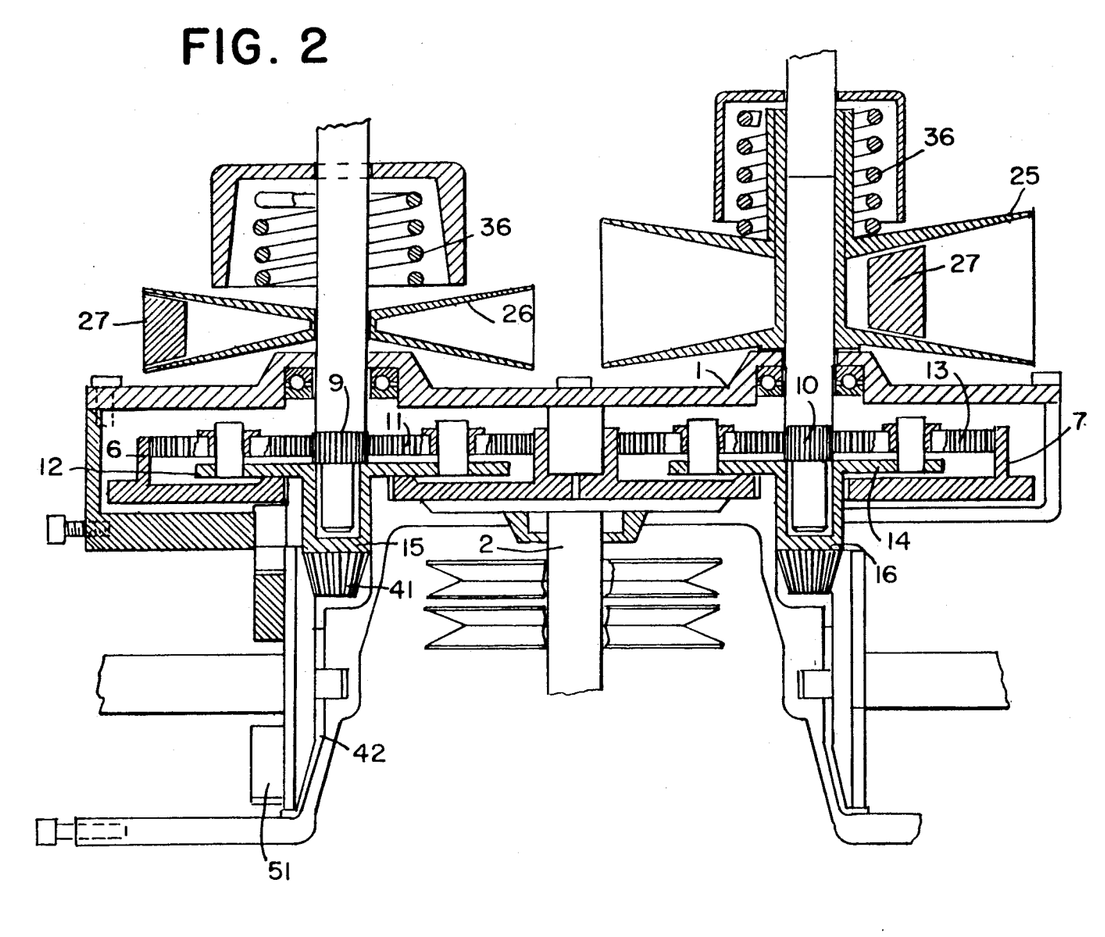
FIG. 2 is a cross sectional view taken through the line 2—2 of FIG. 1.
Figure 3:
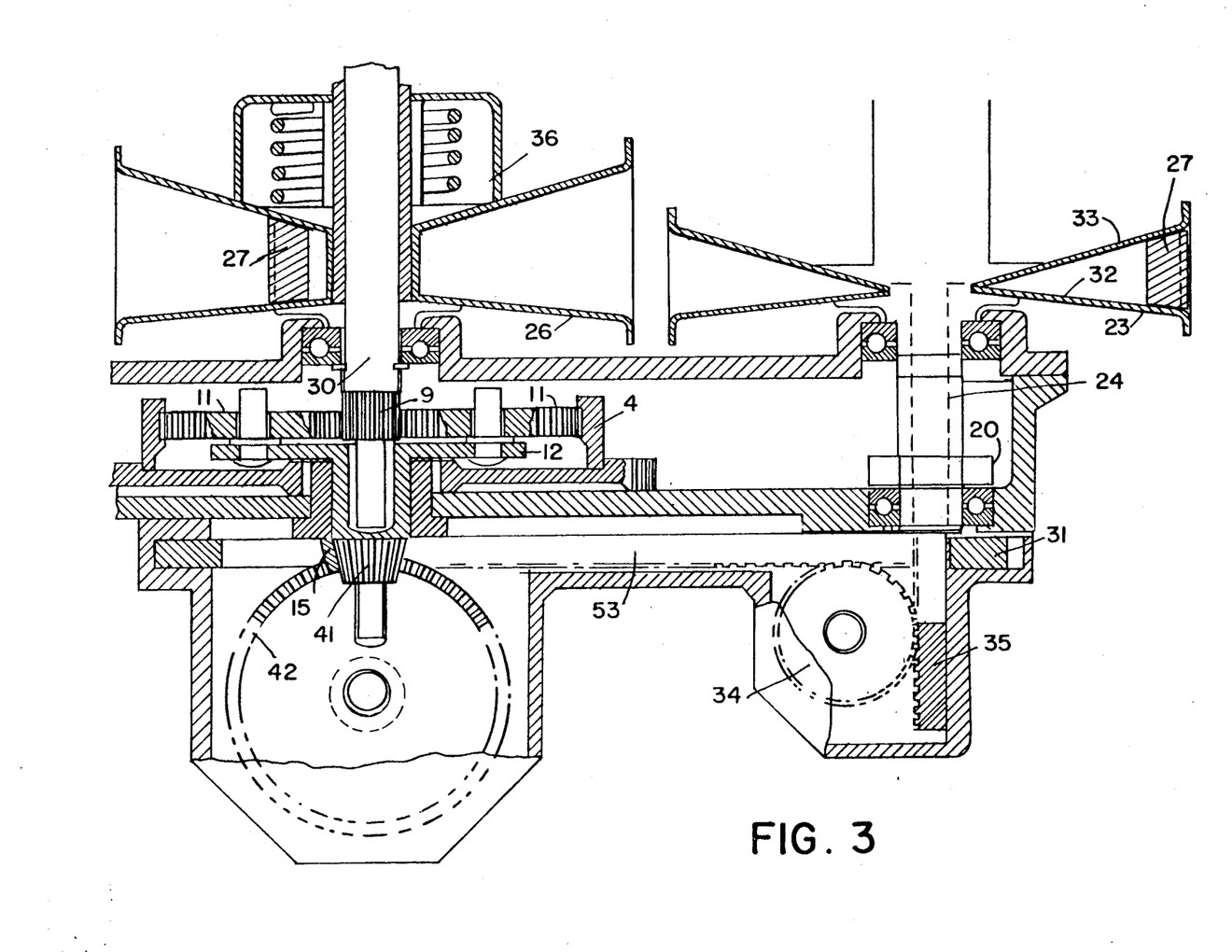
FIG. 3 is a cross sectional view taken through the line 3—3 of FIG. 1.

Referring now first to FIGS. 1-3, a rotary input shaft 2 brings power from an outside power source (not shown), such as a conventional engine, into a lubricant filled housing 1 containing a pair of planetary gear sets 4 and 5.

A left planetary gear set 4 includes a ring gear 6, a sun gear 9 and planet gears 11 mounted on planet gear carrier 12. Left output shaft 15 is driven by gear carrier 12.

A right planetary gear set 5 includes a ring gear 7, a sun gear 10, and planet gears 13 mounted on planet gear carrier 14. Right output shaft 16 is driven by gear carrier 14.

Each sun gear 9, 10 is rotatably mounted on respective output shaft 15, 16.

Input gear 3 on input shaft 2 drives right ring gear 7 directly and left ring gear 6 indirectly in opposide direction through its meshing with ring gear 7.

Input gear 3 also drives first idler gear 17 which drives right variator gear 19 directly and left variator gear 20 indirectly in opposite direction through second idler gear 21. The two variator gears drive right control pulley 22 and left control pulley 23 respectively outside the housing through shafts 24. Control pulleys 22 and 23 are operatively connected to secondary pulleys 25 and 26 respectively by endless belts 27. Secondary pulleys 25 and 26 are directly connected to sun gears 10 and 9 within housing 1 through variator shafts 29 and 30 respectively. Both secondary and control pulleys are variable diameter pulleys. Each set of control and secondary pulleys coupled by a belt comprises the principal elements of the variators of the invention for controlling the speed and direction of rotation of each output shaft. As best seen in FIG. 3, variable width pulley 23 affixed to shaft 24 includes opposed beveled pulley halves 32, 33 which are movable with relation to one another so as to vary the distance between them. In this manner the effective pulley diameter presented to belt 27 can be increased or decreased. Control arm 31 passes through tubular shaft 24 and is fixed at one end to movable pulley half 33. A spur gear 34 is geared to rack 35 on control arm 31. Control of output shaft speed is by rotation of spur gear 34. Pulley 23 is shown in its maximum effective diameter condition. Rotation of spur gear 34 counter clockwise will raise control arm 31 and pulley half 33 to widen the gap between halves. The belt will then fit in closer to the center of the pulley in effect reducing the diameter of the pulley. When this occurs, the belt will loosen and the two halves of secondary pulley 26 will be forced together by compression spring 36, increasing its effective diameter. Consequently secondary pulley and sun gear 9 will be rotating at a slower speed. The planet gears 11 are rotatably mounted on planet carrier 12 and mesh with both sun gear 9 and ring gear 4. When the tangential velocity of the teeth of ring gear 4 is equal to the tangential velocity of the teeth of sun gear 9 rotating in the opposite direction, then each planet gear 11 will spin on its axle, but there will be no rotational force on planet gear carrier 12 and output shaft 15 will not rotate. This is the neutral condition. If control arm 3 is adjusted to change the pulley ratio so that the sun gear cannot rotate as fast, then the carrier 12 will rotate in the direction of the ring gear. If the pulley ratio is changed the other way to increase the sun gear rotation, then the carrier and output will rotate in the opposite direction. In this manner the difference in tangential velocities of the oppositely rotating ring and sun gear will determine the direction and speed of rotation of the output shaft that is connected to the planet gear carrier 12. The power from the input moves through the ring gear and the planet gears to the gear carrier and then to the output shaft. The variator acts by restraining the sun gear from spinning freely and controls the rate of rotation of the sun gear relative to the rate of rotation of the input gear by means of the variable pulley diameters and the belt 27, without transmitting significant power through the belt. Using this structure, a great deal of power can be transmitted through the gear system while regulating and controlling with a pulley and belt system that is too weak to carry a heavy load.

Figure 4:
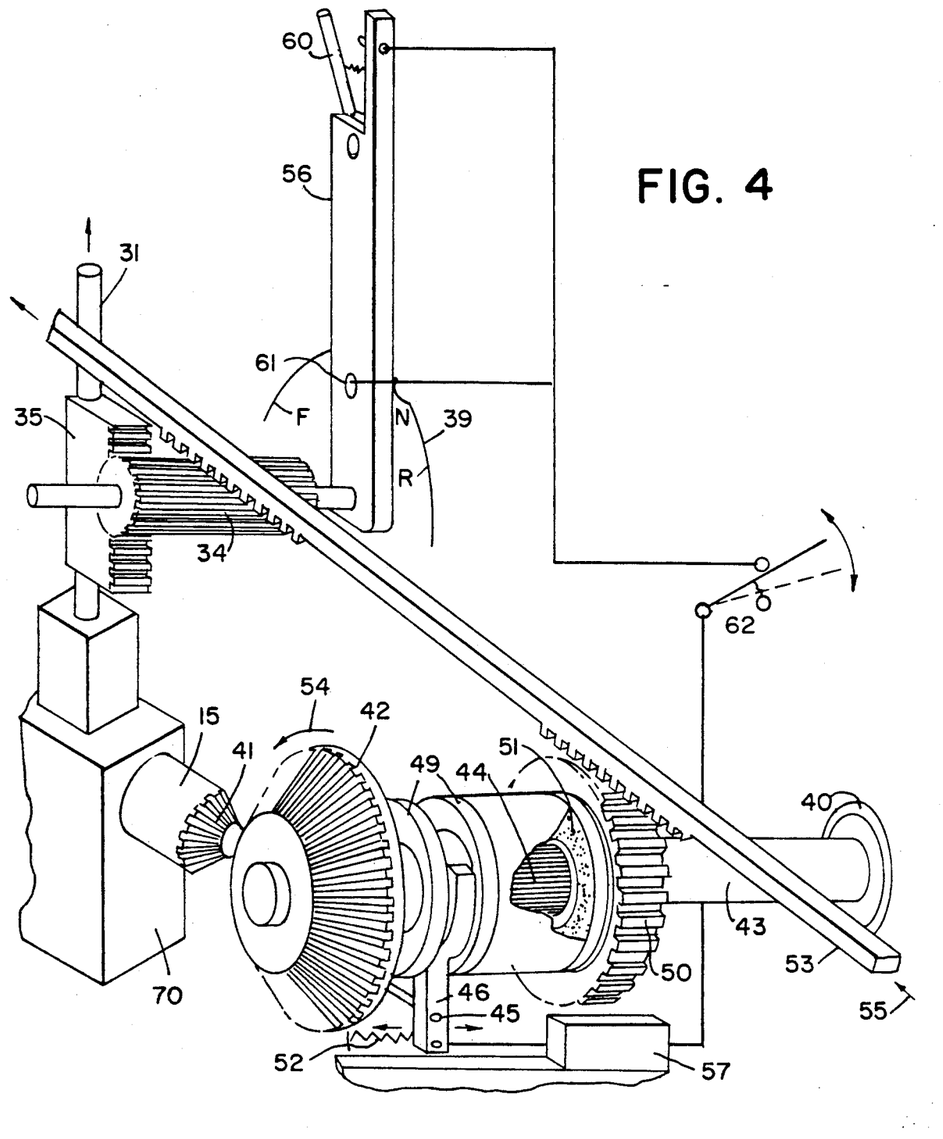
FIG. 4 is a diagrammatic side elevation view of the neutral-seeking control mechanism of one side of the invention.

The neutral-seeking servo mechanism of the invention is best seen in FIG. 4 with those elements of the transmission not necessary for understanding the neutral-seeking mechanism removed. The direction and output of conventional hydraulic transmission 70 is varied by raising and lowering control arm 31. Control arm 31 is raised and lowered by rotation of control gear 34 by hand lever 37 pivoting from high speed forward as indicated by F on quandrant 39, through neutral (N) to high speed reverse (R). The output shaft 15 from the transmission drives right wheel 40 through bevel gears 41, 42 driving axle 43. In the same manner, the axle may drive a track, a propeller or one or more other output devices well known in the art. Splines 44 on axle 43 slideably engage clutch 45. A clutch dog 46 rides in groove 47 with bearings 49 to move the clutch 45 toward or away from clutch gear 50 which is rotatably mounted on the axle 43. A pair of high friction clutch faces 51, one on clutch 45 and the other on clutch gear 50 are forced tightly together by extension spring 52 so that the clutch gear is coupled to the axle. Second rack 53 couples control gear 34 and clutch gear 50 together. With extension spring 52 engaging the clutch, the neutral-seeking mechanism is activated. As shown, the output of the transmission is in reverse and bevel gear 42 is rotated in the direction of arrow 54. Because the clutch 45 is engaged, clutch gear 50 is rotated in the same direction. This moves rack 53 in the direction of arrow 55 which rotates control gear 34 in the same direction as moving the hand control lever 56 toward the forward position. This causes the transmission to slow from reverse toward neutral. This continues until neutral condition is reached. If the transmission goes beyond neutral to forward, then the output rotation will be reversed and the rack 53 will move in the opposite direction until the shaft 41 ceases to rotate in either direction. To disengage the clutch and the neutral-seeking mechanism force must be applied in opposition to spring 52. This clutch-releasing tensile force is applied by actuator 57. This may be any of the actuators well known in the art including mechanical linkage, hydraulic, pneumatic, or electric. Shown here is a preferred electric solenoid that may be activated by switch 59 that is engaged by compression of hand grip 60. Whenever the operator releases the grip, the transmission automatically returns to neutral. Switch 61 is activated by quadrant 39. The quadrant may be rotatable to adjust for changes in the neutral position. Whenever the lever is not in neutral position, the neutral-seeking mechanism is disengaged. Other connections may also be made to actuator 57 to control the neutral-seeking mechanism, as exemplified by normally closed switch 62. This is coupled to a brake pedal so that if the neutral-seeking mechanism is disengaged by either switches 59 or 61, these are disconnected by application of the brakes so that the output moves to neutral. The control gears may be operated by a pair of hand levers such as 56 or foot pedals or other control devices well known in the art.

Figure 5:
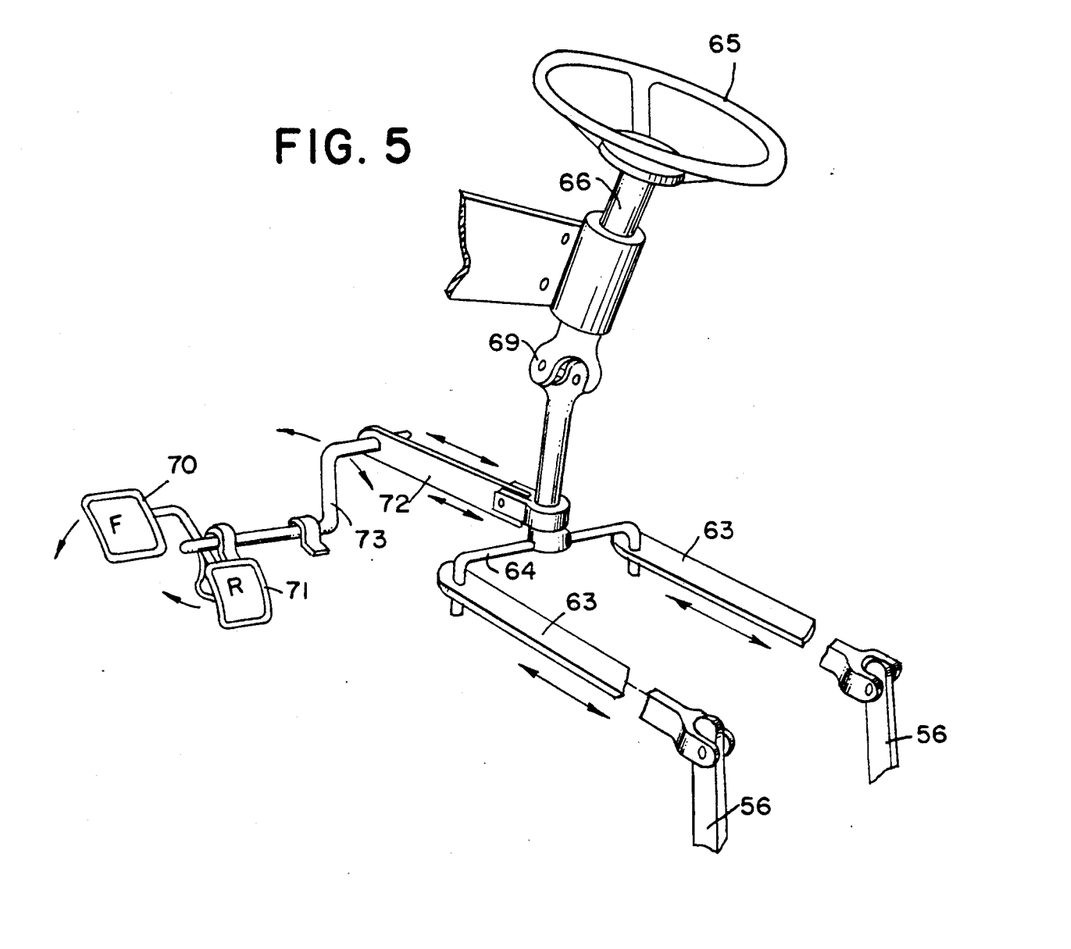
FIG. 5 is a perspective view of an integrated manual steering control mechanism of the invention.

FIG. 5 shows left and right control levers 56 for turning spur gears 34 that move control arms (not shown) for varying pulley diameters to control speed and direction of rotation of the left and right output shafts. For integrated steering and speed control, each control lever is linked by a pivoting linkage bar 63 to one side of a yoke 64 that may be rotated by rotation of steering wheel 65 and steering shaft 66, which moves the two levers in opposite directions to turn the vehicle. Universal joint 69 permits rotation of the shaft. Rotating the steering wheel about its axis will drive one output shaft forward and the other output shaft reverse so that the vehicle will turn in its own length. With the steering wheel centered, pushing pedal 70 operates crank 73 and drives both levers 56 forward and pushing pedal 71 drives both levers 56 to reverse to control speed and direction with foot pedals.

As shown in FIG. 1, the system may employ a second, or auxiliary, power source (not shown) to drive a second input shaft 71 and a second input gear 72 which also drives ring gear 7 and first idler gear 17 as described above for first input shaft 2 and first input gear 3.

The above disclosed invention has a number of particular features which should preferably be employed in combination although each is useful separately without departure from the scope of the invention. While I have shown and described the preferred embodiments of my invention, it will be understood that the invention may be embodied otherwise than as herein specifically illustrated or described, and that certain changes in the form and arrangement of parts and the specific manner of practicing the invention may be made within the underlying idea or principles of the invention.

I claim:

1. A combined stepless transmission and steering apparatus comprising:
   (a) a rotary input shaft means for transmitting power from a rotating power source;
   (b) two rotary output shafts, a first output shaft and a second output shaft;
   (c) two planetary gear assemblies each operatively connected to said input shaft means, a first gear assembly operatively connected to said first output shaft and a second gear assembly operatively connected to said second output shaft; and
   (d) two variator means for stepless controlling of the speed and direction of said output shafts, a first variator means operatively connected between said input shaft means and said first gear assembly and a second variator means operatively connected between said input shaft means and said second gear assembly, wherein operation of said first and second variator means varies the rate and direction of rotation of said output shafts so as to control in a stepless fashion each output shaft rotation independently of the other for control of both speed and direction;
   (e) each said variator means including a pair of variable diameter pulleys and endless belt means for operatively connecting said pulleys; and
   (f) each said planetary gear assembly including: a sun gear operatively connected to one of said pulleys; a planet gear carrier operatively connected to said output shaft; and a ring gear operatively connected to said input shaft means;
   in which each said variator means includes a bidirectional control means for controlling both the rate and direction of rotation of said output shaft, whereby movement of said control means in a first direction from a first extreme position to a second extreme position varies said output shaft from a maximum rate of clockwise rotation through progressively slower rates to zero output at an intermediate position of said control means and then through progressively faster counterclockwise rotation to maximum rate at a second extreme position. shaft, whereby movement of said control means in a first direction from a first extreme position to a second extreme position varies said output shaft from a maximum rate of clockwise rotation through progressively slower rates to zero output at an intermediate position of said control means and then through progressively faster counterclockwise rotation rates to maximum rate at a second extreme position.

2. The apparatus according to claim 1 further comprising a neutral-seeking mechanism including connecting means for removably connecting said bidirectional control means to said output shaft so that when said output shaft turns clockwise, it moves said control means in said first direction toward said second extreme position, and when said output shaft turns counterclockwise it moves said control means in a second direction away from said second extreme position to thereby cause said control means to seek said intermediate position wherein said output shaft does not rotate.

3. The apparatus according to claim 2 in which said connecting means includes an operative connection to a brake for automatically engaging said connecting means to stop said output shaft from rotating when said brake is applied.

4. The apparatus according to claim 2 in which said connecting means includes an operative connection to an operator control member, whereby movement of said operator control member to a neutral position engages said connecting means to stop said output shaft from rotating.

5. The apparatus according to claim 2 further comprising operator activity sensing means for sensing a particular operator activity, said sensing means operatively attached to said connecting means whereby said connecting means connects said bidirectional control means to said output shaft when said operator is not engaging in said activity and is disconnected when said operator is engaging in said activity.

6. The apparatus according to claim 2 in which said connecting means includes hydraulic elements.

7. The apparatus according to claim 2 in which said connecting means includes electric elements.

8. The mechanism according to claim 2 in which said bidirectional control means includes elements selected from the group including hydraulic and pneumatic elements.

9. The apparatus according to claim 2 in which said bidirectional control means includes electric elements.

10. The apparatus according to claim 1 in which each said output shaft is connected to a separate wheel of a wheeled vehicle.

11. The apparatus according to claim 1 in which each said output shaft is connected to a separate track of a tracked vehicle.

12. The apparatus according to claim 1 in which each said output shaft is connected to a separate propeller of a vehicle.

13. The apparatus according to claim 1 further comprising at least two rotary input shaft means for transmitting power from at least two rotating power sources; said input shaft means operatively connected to said two planetary gear assemblies and said two variator means.

14. The apparatus according to claim 1, in which said input shaft means is operatively geared to a first ring gear and said first ring gear is operatively geared to a second ring gear, said first and second ring gears being coplanar and said two planetary gear assemblies being contained within a single common lubricant containing enclosure.

15. The apparatus according to claim 14, in which said endless belt means and said pulleys are external to said enclosure.

16. The apparatus according to claim 1, in which said sun gear is rotatably mounted on said output shaft.

17. The apparatus according to claim 1, in which said endless belt means controllably limits the speed of rotation of said sun gear to oppose the torque applied by said planetary gear assembly to thereby control output shaft rotation speed.

18. A combined stepless transmission and steering apparatus comprising:
(a) a rotary input shaft means for transmitting power from a rotating power source;
(b) two rotary output shafts, a first output shaft and a second output shaft;
(c) two hydraulic drive assemblies each operatively connected to said input shaft means, a first hydraulic drive assembly operatively connected to said first output shaft and a second hydraulic drive assembly operatively connected to said second output shaft; and
(d) two control means for stepless controlling of the speed and direction of said output shafts, a first control means operatively connected to said first hydraulic drive assembly and a second control means operatively connected to said second hydraulic drive assembly, wherein operation of said first and second control means varies the rate and direction of rotation of said output shafts so as to control in a stepless fashion each output shaft rotation independently of the other for control of both speed and direction;
(e) in which each said control means includes a bidirectional control means for controlling both the rate and direction of rotation of said output shaft, whereby movement of said control means in a first direction from a first extreme position to a second extreme position varies said output shaft from a maximum rate of clockwise rotation through progressively slower rates to zero output at an intermediate position of said control means and then through progressively faster counterclockwise rotation rates to maximum rate at a second extreme position; and
(f) a neutral-seeking mechanism including connecting means for removably connecting said bidirectional control means to said output shaft so that when said output shaft turns clockwise, it moves said control means in said first direction toward said second extreme position, and when said output shaft turns counterclockwise it moves said control means in a second direction away from said second extreme position to thereby cause said control means to seek said intermediate position wherein said output shaft does not rotate.

19. The apparatus according to claim 18 in which each said output shaft is connected to a separate wheel of a wheeled vehicle.

20. The apparatus according to claim 18 in which each said output shaft is connected to a separate track of a tracked vehicle.

21. The apparatus according to claim 18 in which each said output shaft is connected to a separate propeller of a vehicle.

22. The apparatus according to claim 18 in which said connecting means includes an operative connection to a brake for automatically engaging said connecting means to stop said output shaft from rotating when said brake is applied.

23. The apparatus according to claim 17 in which said connecting means includes an operative connection to an operator control member, whereby movement of said operator control member to a neutral position engages said connecting means to stop said output shaft from rotating.

24. The apparatus according to claim 17 further comprising operator activity sensing means for sensing a particular operator activity, said sensing means operatively attached to said connecting means whereby said connecting means connects said bidirectional control means to said output shaft when said operator is not engaging in said activity and is disconnected when said operator is engaging in said activity.

25. The apparatus according to claim 18 in which said connecting means includes hydraulic elements.

26. The apparatus according to claim 18 in which said connecting means includes electric elements.

27. The apparatus according to claim 18 in which said bidirectional control means includes elements selected from the group including hydraulic and pneumatic elements.

28. The apparatus according to claim 18 in which said bidirectional control means includes electric elements.

29. A combined transmission and control apparatus comprising:
(a) at least one rotary input shaft means for transmitting power from at least one rotating power source;
(b) a plurality of rotary output shafts including a first output shaft and a second output shaft;
(c) a plurality of stepless transmissions each operatively connected to said input shaft means, including a first stepless transmission operatively connected to said first output shaft and a second stepless transmission operatively connected to said second output shaft; and
(d) a plurality of control means for stepless controlling of the speed and direction of rotation of said output shafts, a first control means operatively connected to said first stepless transmission and a second control means operatively connected to said second stepless transmission, wherein operation of said first and second control means varies the rate and direction of rotation of said output shafts so as to control in a stepless fashion each output shaft rotation independent of the other for control of both speed and direction;
(e) in which movement of said control means in a first direction from a first extreme position to a second extreme position varies said output shaft from a maximum rate of clockwise rotation through progressively slower rates to zero output at an intermediate position of said control means and then through progressively faster counterclockwise rotation rates to maximum rate at a second extreme position, and further comprising a neutral-seeking mechanism including connecting means for removably connecting said control means to said output shaft so that when said output shaft turns clockwise, it moves said control means in said first direction toward said second extreme position, and when said output shaft turns counterclockwise it moves said control means in a second direction away from said second extreme position to thereby cause said control means to seek said intermediate position wherein said output shaft does not rotate.

* * * * *